United States Patent [19]
Eidson et al.

[11] Patent Number: 6,078,847
[45] Date of Patent: Jun. 20, 2000

[54] SELF-ORGANIZING MATERIALS HANDLING SYSTEMS

[75] Inventors: John C. Eidson, Palo Alto; Hans Sitte, San Jose, both of Calif.

[73] Assignee: Hewlett-Packard Company, Palo Alto, Calif.

[21] Appl. No.: 08/976,733

[22] Filed: Nov. 24, 1997

[51] Int. Cl.[7] .................................................. G06F 17/00
[52] U.S. Cl. ............................................. 700/229; 700/228
[58] Field of Search .................... 364/478.16, 478.17, 364/478.18, 478.14; 198/575, 576, 571, 341.07, 349.6, 349.7, 349.9

[56] References Cited

U.S. PATENT DOCUMENTS

| | | | |
|---|---|---|---|
| Re. 35,663 | 11/1997 | Mori et al. ........................ | 198/341.07 |
| 4,307,446 | 12/1981 | Barton et al. ........................ | 364/200 |
| 5,150,781 | 9/1992 | Deisenroth et al. ................. | 198/349.8 |
| 5,186,308 | 2/1993 | Munro ..................................... | 198/575 |
| 5,228,558 | 7/1993 | Hall ........................................ | 198/575 |
| 5,247,650 | 9/1993 | Judd et al. ............................. | 364/221 |
| 5,333,267 | 7/1994 | Sweazey ................................. | 395/200 |
| 5,499,374 | 3/1996 | De Giulio et al. .................... | 395/728 |
| 5,663,884 | 9/1997 | Nishihata et al. ................. | 364/478.16 |
| 5,717,853 | 2/1998 | Despande et al. ................... | 395/200.1 |
| 5,761,458 | 6/1998 | Young et al. ........................... | 395/308 |
| 5,768,139 | 6/1998 | Pippin et al. ..................... | 364/478.18 |

*Primary Examiner*—Christopher P. Ellis
*Assistant Examiner*—Khoi H. Tran

[57] ABSTRACT

A materials handling system which is made up of self-organizing components that provide distributed materials handling control without intervention or control by a centralized controller.

17 Claims, 8 Drawing Sheets

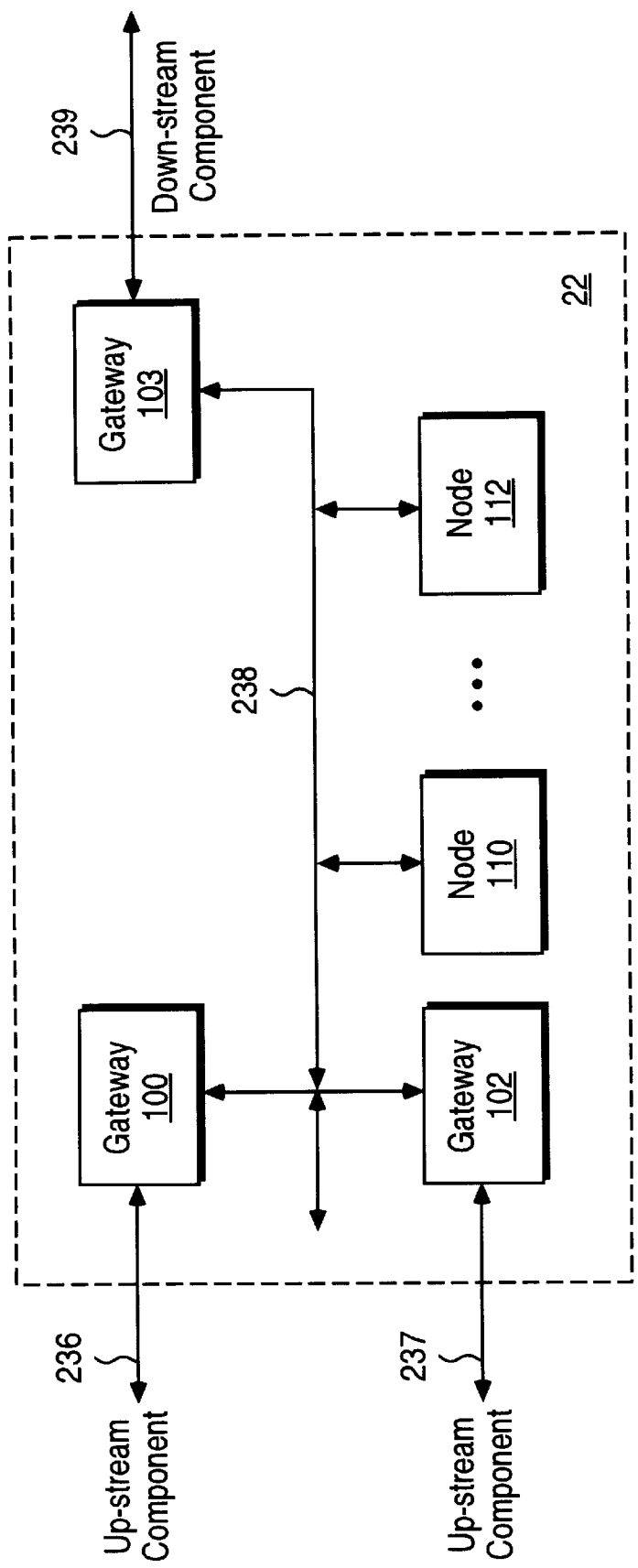

SELF-ORGANIZING MATERIALS HANDLING SYSTEMS

BACKGROUND OF THE INVENTION

1. Field of Invention

The present invention pertains to the field of materials handling systems. More particularly, this invention relates to self-organizing materials handling systems.

2. Art Background

Materials handling systems typically include a variety of standard mechanical assemblies for transporting items. Such standard mechanical assemblies include powered or unpowered conveyors which may include rollers, belts or other conveyor mechanisms. Such assemblies also include specialized components which are adapted for systems used in specific industries. Such components include sensors for tracking the movement of items in the system and actuators for routing the items among the various paths in the system.

In prior materials handling systems, the sensors and actuators are usually moderated by a central controller. Typically, the central controller is programmed to obtain information from the sensors and provide the appropriate control inputs to the actuators as the particular process requires. Unfortunately, such a programming task along with the necessary debugging time typically consumes a large fraction of the cost and time required to develop such prior materials handling systems.

SUMMARY OF THE INVENTION

A self-organizing materials handling system is disclosed which is made up of components that provide distributed control without intervention by a centralized controller. The self-organizing components are selected from a set of basic components which realize basic topologies. Each basic component includes self-organizing elements which enable a component to obtain a description of its nearest neighbors and which provides logical communication paths between nearest neighbor components. The self-organizing elements also provide the components with information for rendering local item routing decisions without intervention or control by a centralized controller. The self-organizing elements enable the establishment of an information base which indicates the complete topology of a materials handling system and which enables periodic updates. These advantages are realized through the selection of the components and the assembly of the components into the desired mechanical topology.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which:

FIG. 3 illustrates one embodiment of the self-organizing elements in a component including gateways;

DETAILED DESCRIPTION

Figure 1:
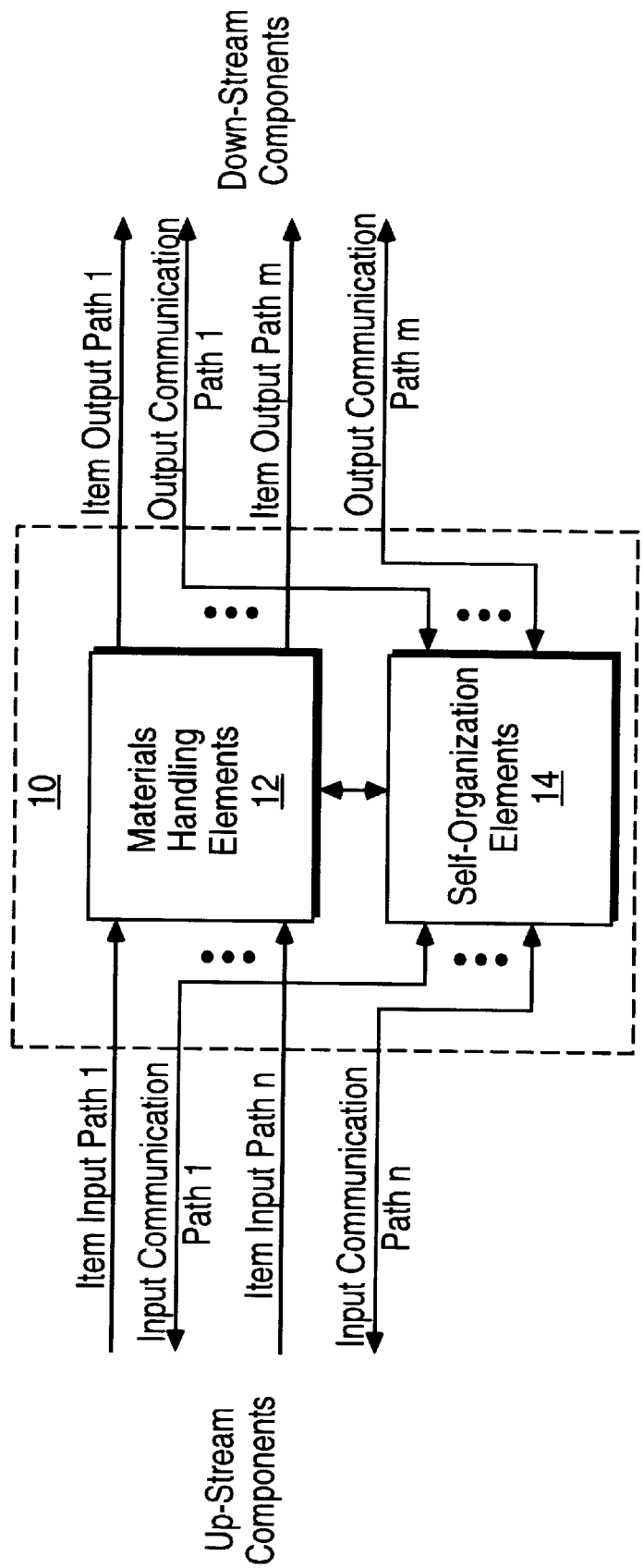
FIG. 1 illustrates a component for a self-organizing materials handling system.
Figure 2A:
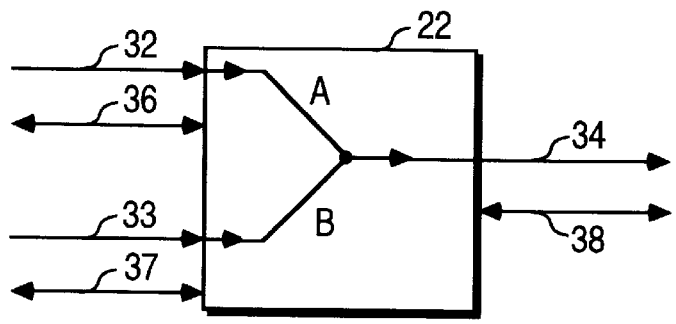
FIGS. 2a–2g show a set of basic components which provide an assortment of materials handling topologies from which a self-organizing materials handling system may be constructed.
Figure 2B:
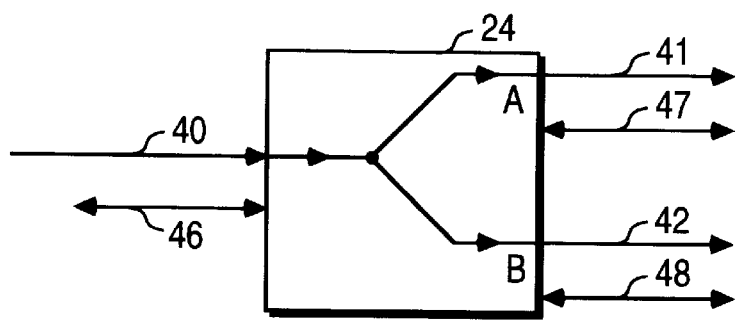
Figure 2C:
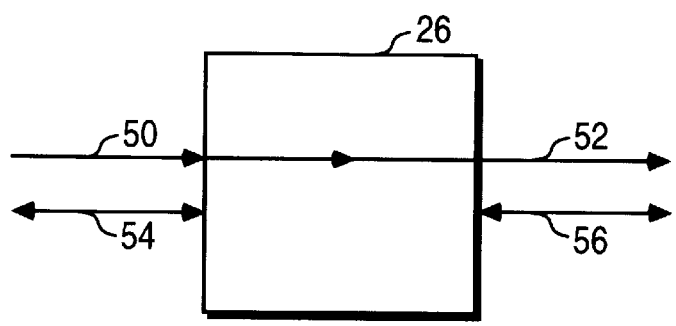
Figure 2D:
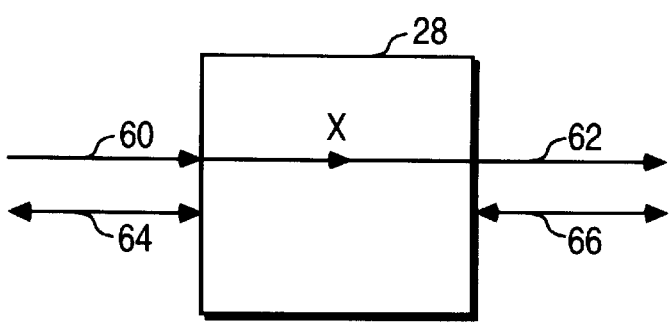
Figure 2E:
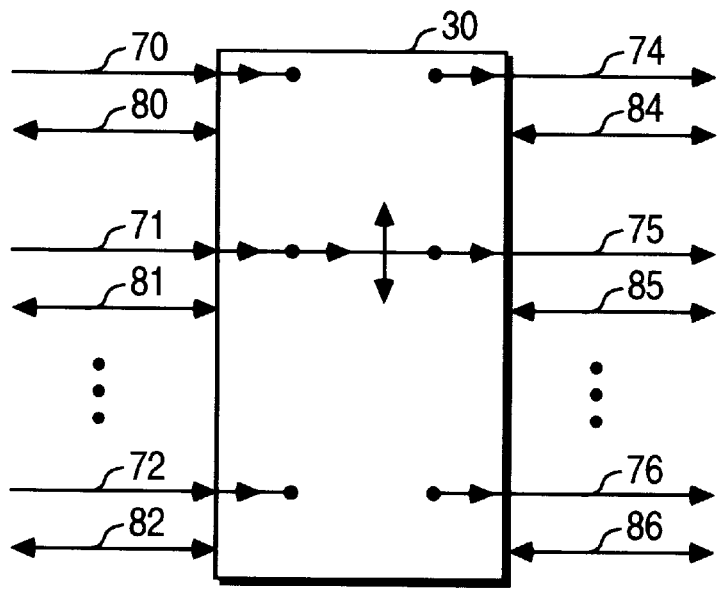
Figure 2F:
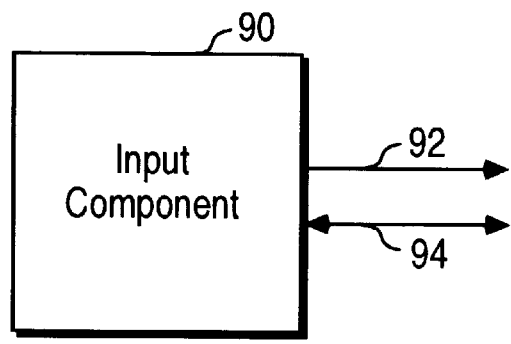
Figure 2G:
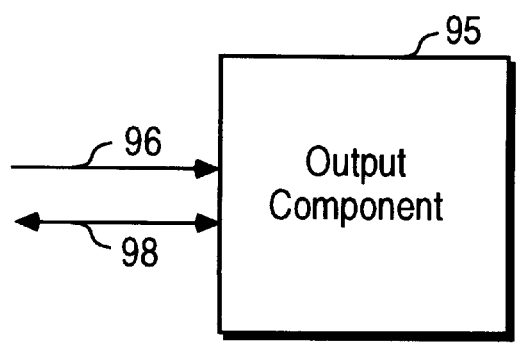

FIG. 1 illustrates a component 10 for a self-organizing materials handling system. The component 10 includes materials handling elements 12 that receive items via a set of item input paths 1–n and convey the items to a set of item output paths 1–m. The items received via the item input paths 1–n are in general received from one or more components which are located upstream in a materials handling system of which the component 10 is part. The item output paths 1–m are used to convey items to one or more down-stream components in the materials handling system of which the component 10 is part. Components which attach directly to the item input paths 1–n are referred to as upstream nearest neighbor components to the component 10 and components which attach directly to the item output paths 1–m are referred to as down-stream nearest neighbor components to the component 10.

The component 10 includes self-organizing elements 14 which include mechanisms for obtaining information pertaining to the upstream and down-stream components in the system in which the component 10 is installed. The information obtained from up-stream and down-stream components enables the component 10 to construct a topological map of the system and to render appropriate decisions as to which of the item output paths 1–m to convey items received on the item input paths 1–n.

The self-organizing elements 14 exchange information with other self-organizing components and nodes in a materials handling system via a set of input communication paths 1–n and a set of output communication paths 1–m. The input communication paths 1–n correspond one-to-one with the item input paths 1–n and the output communication paths 1–m correspond one-to-one to the item output paths 1–m. For example, the item input path 1 and the input communication path 1 both connect to a particular upstream nearest neighbor component. Similarly, the item output path 1 and the output communication path 1 both connect to a particular down-stream nearest neighbor component.

The communication paths 1–n and 1–m are referred to as nearest neighbor communication paths for the component 10. The nearest neighbor communication paths 1–n and 1–m may be implemented with separate physical communication links. Alternatively, the communication paths 1–n and 1–m may be implemented as logical portions of one or more shared physical communication links.

The self-organizing elements 14 also make use of a global communication path in the materials handling system of which the component 10 is part. The global communication path may be implemented with a separate physical communication link. Alternatively, the global communication path may share the physical communication links of the nearest neighbor communication paths 1–n and 1–m. In addition, the component 10 includes a local communication path which is used locally for communication among the self-organizing elements 14.

FIGS. 2a–2g show a set of basic components 22–30, 90 and 95 which provide an assortment of materials handling topologies from which a self-organizing materials handling system may be constructed. The basic components 22–30, 90 and 95 include a merge component 22, a divert component 24, a straight component 26, a straight with process component 28, an elevator component 30, an input component 90 and an output component 95.

The merge component 22 includes materials handling elements that provide a basic topology for merging two streams of items. The merge component 22 includes a pair of item input paths 32–33 and an item output path 34. The self-organization elements in the merge component 22 provides a pair of input communication paths 36–37 for communication with upstream components and an output communication path 38 that enables communication with downstream components. The input communication paths 36–37 enable communication with the upstream components that feed the item input paths 32–33, respectively. The output communication path 38 enables communication with the downstream components that are fed by the item output path 34. The input communication paths 36–37 and the output communication path 38 are the nearest neighbor input and output communication paths for the merge component 22.

The divert component 24 includes materials handling elements that provide a basic topology for diverting items into two streams. The divert component 24 includes an item input path 40 and a pair of item output paths 41–42. The self-organization elements in the divert component 24 provides an input communication path 46 for communication with upstream components that feed the item input path 40 and a pair of output communication paths 47–48 that enable communication with downstream components that are fed by the item output paths 41–42. The output communication paths 47–48 enable communication with the down-stream components that are fed by the item output paths 41–42, respectively. The input communication path 46 and the output communication paths 47–48 provide the nearest neighbor input and output communication paths for the divert component 24. It will be appreciated that "switch yards" of any practical complexity can be constructed based on the merge and divert components 22 and 24.

The straight component 26 provides for transfers or queues and similar sections. The straight component 26 includes a single path with only two end points and may be arranged into curves, corners, rises, falls, etc. The straight component 26 includes an item input path 50 and a corresponding input communication path 54 that enables communication with upstream components which feed the item input path 50. The straight component 26 also includes an item output path 52 and a corresponding output communication path 56 that enables communication with downstream components that are fed by the item output path 52.

The straight with process component 28 represents sections for transfer or queues and similar sections which are involved with an application process X. The straight with process component 28 includes an item input path 60 and an input communication path 64 that enables communication with upstream components that feed the straight with process component 28. The straight with process component 28 also includes an item output path 62 and an output communication path 66 that enables communication with the downstream components that are fed by the item output path 62.

The elevator component 30 represents vertical and horizontal elevator components. The elevator component 30 includes a set of item input paths 70–72 and a set of input communication paths 80–82 which enable communication with upstream components that feed the item input paths 70–72, respectively. The elevator component 30 includes a set of item output paths 74–76 and a set of output communication paths 84–86 which enable communication with down-stream components which are fed by the item output paths 74–76, respectively.

The input component 90 includes mechanical and related mechanisms that enable the injection of items into a materials handling system. The input component 90 conveys the items to downstream components via an item path 92. The input component 90 includes a nearest neighbor communication path 94 for communication with a component coupled to the item path 92. The input component 90 includes a processor and related elements that enable communication via the communication path 94 including processing of self-organizing messages.

The output component 95 includes mechanical and related mechanisms for removing processed items from a materials handling system. The output component 95 receives items from up-stream components via an item path 96. The output component 95 includes a nearest neighbor communication path 98 for communication with a component coupled to the item path 96. The output component 95 includes a processor and related elements that enable communication via the communication path 98 including processing of self-organizing messages.

A self-organizing materials handling system may be designed by selecting the appropriate components for the desired overall topology for the system from among the basic components 22–30, 90 and 95. Once connected into a system, the selected components recognize their nearest neighbor components in the system in both the up-stream and downstream directions.

FIG. 3 illustrates one embodiment of the self-organizing elements in the merge component 22. The self-organizing elements of the other basic components 24–30, 90 and 95 may contain similar implementations but with appropriate variations based upon the particular topology of the component.

The local communication path and the nearest neighbor communication paths 32–34 of the merge component 22 as well as the global communication path for the system in which the component 22 is to be installed are realized using a set of physical communication links 236–239 and a set of gateways 100–103. The physical communication links 236 and 237 enable communication with up-stream components coupled to the item input paths 32 and 33, respectively, of the merge component 22. The physical communication link 239 enables communication with a downstream component coupled to the item output path 34 of the merge component 22.

The physical communication link 238 enables communication among a set of nodes 110–112 in the merge component 22. The nodes 110–112 are used to monitor and control the materials handling elements in the merge component 22. These materials handling elements include mechanisms for selecting a merge path, proximity sensors which enable detection of items in the merge component 22, and the motors for conveyors in the merge component 22. In addition, one of the nodes 110–112 as a configuration node for the merge component 22 performs the self-organizing functions associated with the merge component 22. These self-organizing functions include the monitoring of the nearest neighbor and global communication paths for self-organization messages and generation of self-organizing and topology determination messages as hereinafter described.

The gateways 100–103 prevent communication packets associated with the local communication path of the merge component 22 from propagating to the physical communication links 236–237 and 239.

The gateway 100 propagates communication packets associated with the nearest neighbor input communication path 36 while the gateways 102–103 block such communication packets. The gateway 102 propagates communication packets associated with the nearest neighbor input communication path 37 while the gateways 100 and 103 block such communication packets. The gateway 103 propagates communication packets associated with the nearest neighbor output communication path 38 while the gateways 100–102 block such communication packets. In addition, the gateways 100–103 propagate communication packets associated with the global communication path.

The communication packets associated with each of the nearest neighbor communication paths 36–38 and the global communication path and the local communication path of the merge component 22 may be distinguished by addresses contained in individual communication packets. For example, the communication packets associated with the nearest neighbor output communication path 38 include an address associated with the down-stream component connected to the item output path 34. The communication packets associated with the nearest neighbor input communication paths 36–37 contain addresses associated upstream components connected to the item input paths 32–33, respectively. The communication packets associated with the local communication path of the merge component 22 contain addresses which are allocated for local communication among the nodes 110–112. The communication packets associated with the global communication path contain addresses allocated for global communication in the materials handling system in which the merge component 22 is installed.

The physical communication links 236–239 in this embodiment may be implemented with a variety of networks including Ethernet networks and field-bus networks which are specialized for the process control environment.

Branching components make it possible for duplicate packets to be generated. As a consequence, the gateways 100–103 are preferably implemented to not pass duplicates.

The gateways 100–102 are associated with the upstream entry points of the merge component 22 and are used to polarize communication associated with the merge component. Preferably, the mechanical aspects of all of the basic components 22–30, 90 and 95 reflect this polarization so as to make it impossible to install the components backwards.

It will be appreciated that while three gateways 100–103 are shown, this functionality may be implemented in a single device with two upstream network ports and another device with a downstream port.

Figure 4:
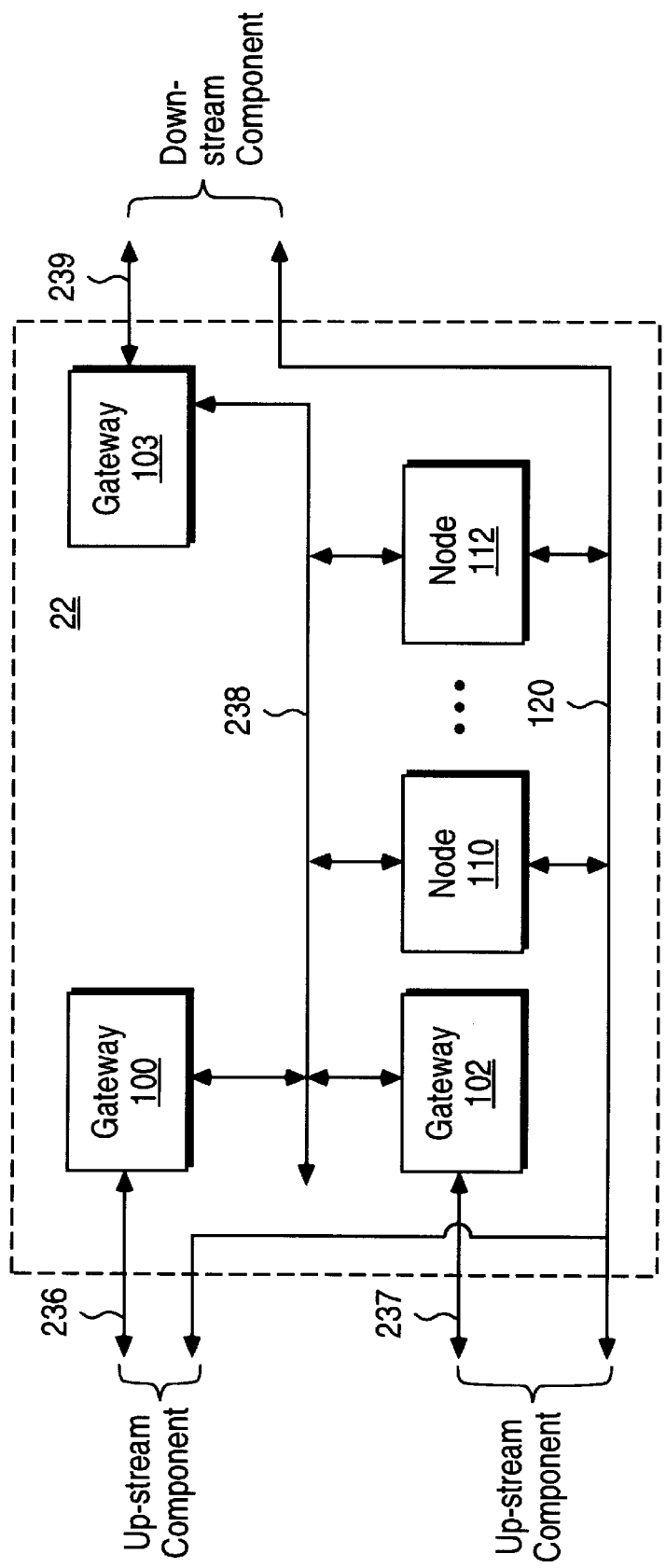
FIG. 4 illustrates another embodiment of the self-organizing elements in a component including a global network.

FIG. 4 illustrates another embodiment of the self-organizing elements in the merge component 22. This embodiment is similar to the previous embodiment with the addition of a global network 120. The global network 120 is shared by all components in a materials handling system and is used for the global communication path. This embodiment enables the use of simplified gateways in the components of a system, such as the gateways 100–103. The self-organizing elements of the other basic components 24–30, 90 and 95 may contain similar implementations but with appropriate variations based upon the particular topology of the component.

Figure 5:
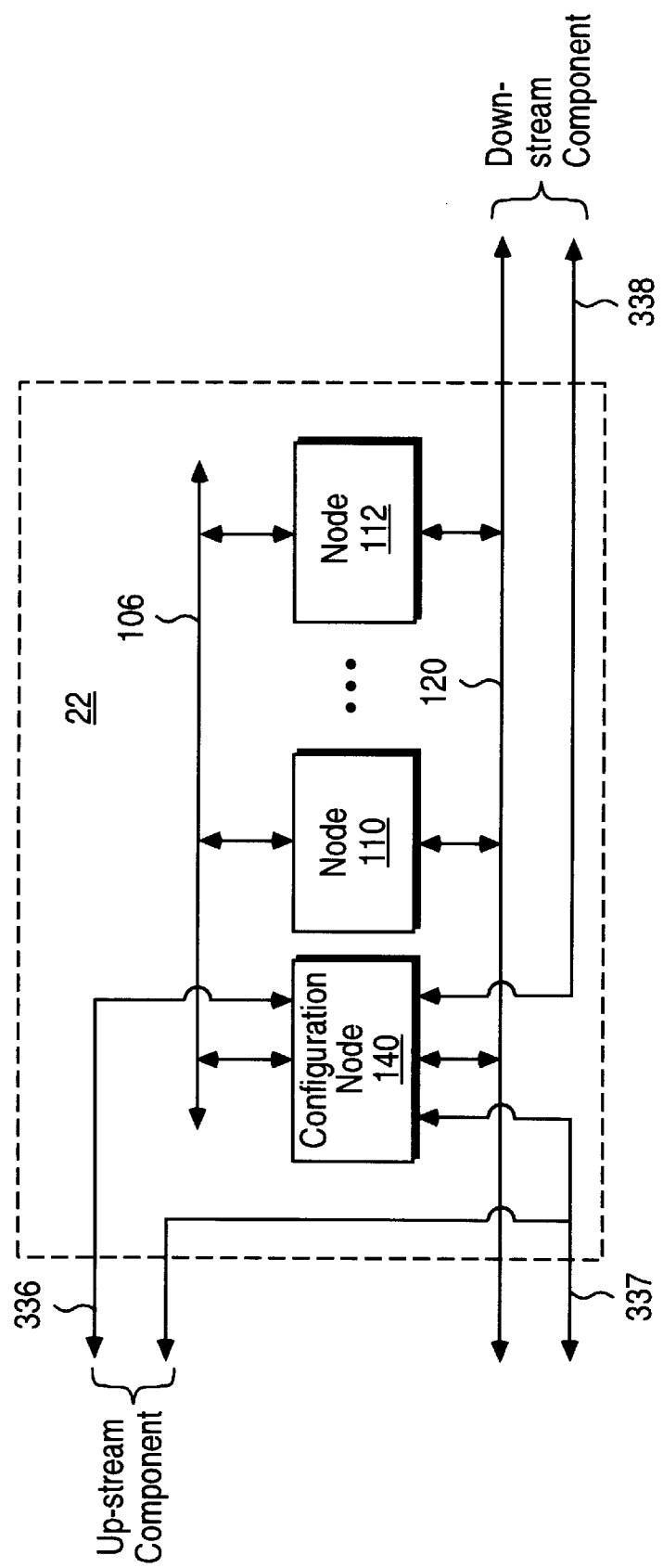
FIG. 5 illustrates yet another embodiment of the self-organizing elements in a component including dedicated communication links.

FIG. 5 illustrates yet another embodiment of the self-organizing elements in the merge component 22. The self-organizing elements of the other basic components 24–30, 90 and 95 may contain similar implementations but with appropriate variations based upon the particular topology of the component. The local communication path is realized by a component network 106 in the merge component 22. The global network 120 is used for communication associated with the global communication path.

The nearest neighbor communication paths in this embodiment are realized with a set of dedicated physical communication links 336–338. The physical communication link 336–337 are used for communication associated with the nearest neighbor input communication paths 36–37, respectively. The physical communication link 338 is used for communication associated with the nearest neighbor output communication path 38.

The physical communication links 336–338 may use the same technology as the global network 120, Ethernet for example, or a point to point technology such as RS-232 or another serial protocol. Alternatively, the communication links 336–338 may be implemented with a shared memory or dual port RAM based communication within a configuration node 140. Each of the communication links 336–338 may be a single bi-directional link or two links one in each direction.

Figure 6:
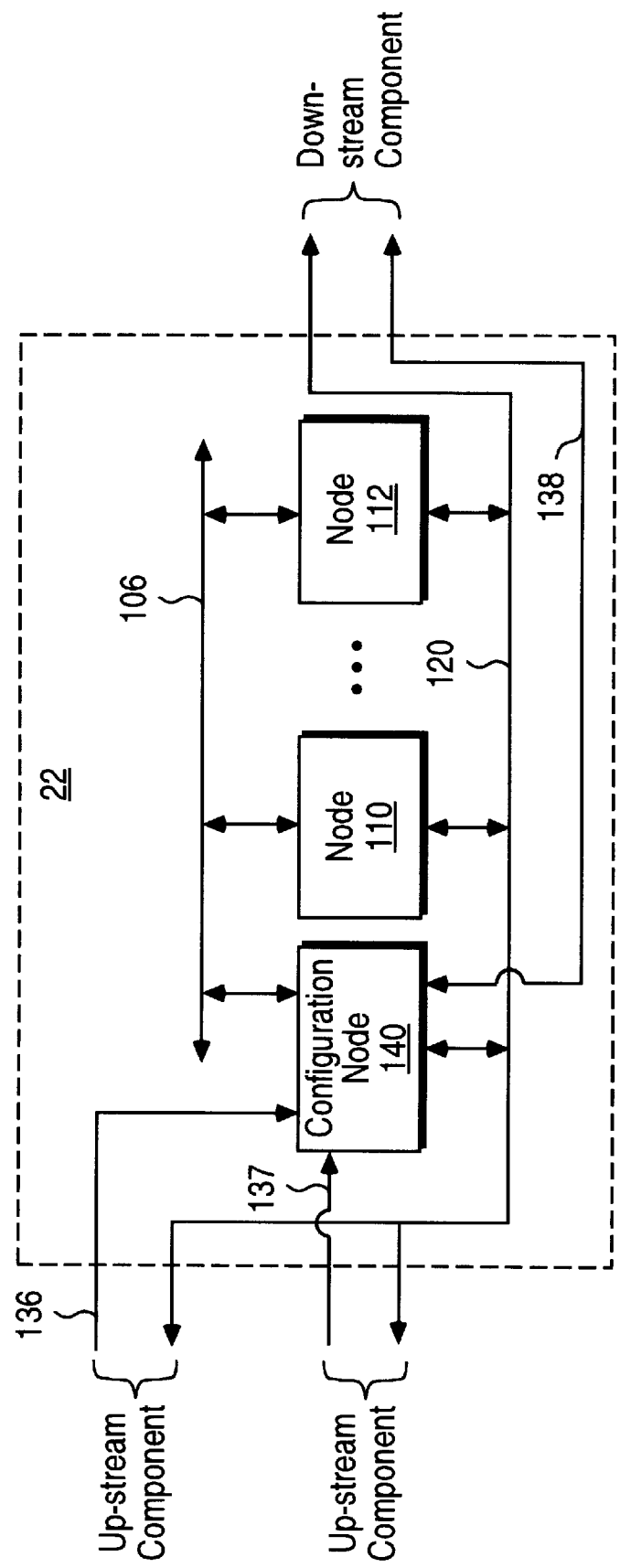
FIG. 6 illustrates another embodiment of the self-organizing elements in a component including sense lines for nearest neighbor components.

FIG. 6 illustrates another embodiment of the self-organizing elements in the merge component 22. The self-organizing elements of the other basic components 24–30, 90 and 95 may contain similar implementations but with appropriate variations based upon the particular topology of the component. A component network 106 is used for the local communication path of the merge component 22 while the global network 120 is used for communication associated with the global communication path and the nearest neighbor communication paths 36–38. Communication packets for the nearest neighbor communication paths are distinguished using unique identifiers which are obtained by the configuration node 140 via a set of sense lines 136–138 from nearest neighbor components.

The sense line 136 is used by the configuration node 140 to obtain a unique identifier for the upstream nearest neighbor component connected to the item input path 32. The sense line 137 is used by the configuration node 140 to obtain a unique identifier for the upstream nearest neighbor component connected to the item input path 33. The sense line 138 is used by the configuration node 140 to obtain a unique identifier for the down-stream nearest neighbor component connected to the item output path 34.

Globally unique names for the components in a system may be standardized in a variety of ways. For example, a unique name may be formed by concatenating a unique ID (UID) associated with an upstream component with a port ID unique within a component. An upstream straight component connected to the input B port on the merge component 22 may be logically designated as UIDstraight:B.

The configuration node 140 uses the dedicated communication links 136–138 to learn of the UIDs of the upstream and downstream components. The neighbors then negotiate the communication path names using the global network 120 or the dedicated communication links 136–138 with packets addressed by UID. Alternatively, the direct communication links 136–138 may be replaced by appropriate sensors at the boundaries which can sense the adjacent UID.

The above arrangements for the self-organizing elements in the basic components 22–30, 90 and 95 provide three distinguishable communication systems, each with its own purpose. The global communication path is for information shared across the system or at least beyond the nearest neighbors. The local communication path is for communication with devices associated with the component itself. The nearest neighbor communication paths are dedicated to information transfer which is done on a nearest neighbor basis.

A gateway implementation of the divert component 24 includes a gateway on each downstream output and on the up-stream input of the divert component 24. The elevator component 30 has the same character. This is because it is the gateway which logically separates the packets for the two otherwise indistinguishable branches of the network.

The straight with process component 28 may be implemented with an X communication path that is used to communication with the elements involved in the process X. The X communication path enables nodes in the component 28 to obtain information regarding the process via the X communication path and then configure the process X appropriately.

Figure 7:
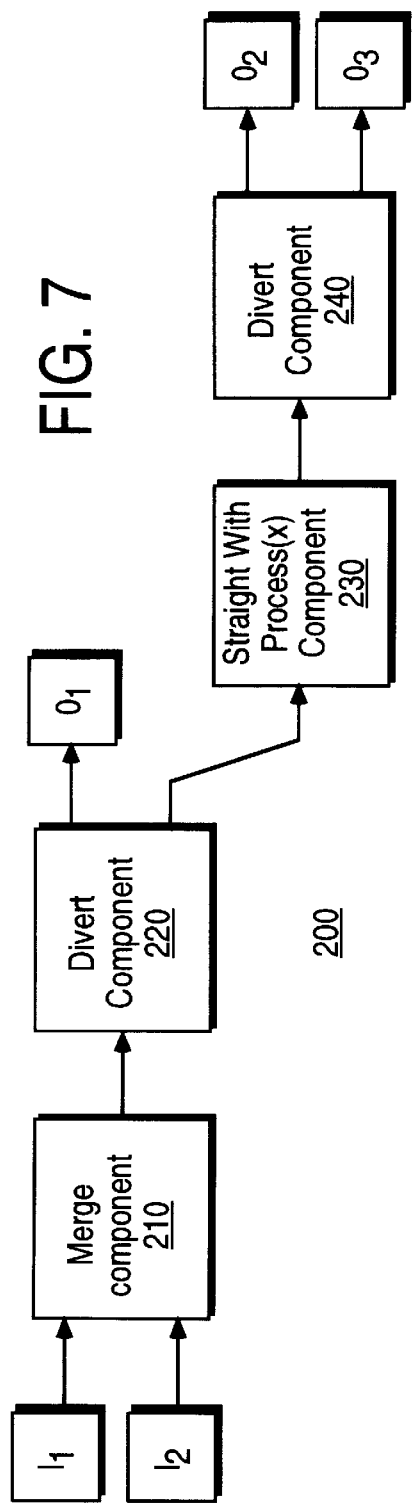
FIG. 7 shows a materials handling system which includes a set of components which are selected from among the basic components.

FIG. 7 shows a materials handling system 200 which includes a set of components 210–240, $I_1$–$I_2$, $O_1$–$O_3$ which are selected from among the basic components 22–30, 90 and 95. The component 210 is a merge component such as the basic component 22. The components 220 and 240 are each a divert component such as the divert component 24. The component 230 is a straight with process component such as the straight with process component 28. The components 210–240 each include the self-organization elements that form the corresponding nearest neighbor and global communication paths.

A pair of input nodes $I_1$–$I_2$ provide input functions for the materials handling system 200. The input nodes $I_1$–$I_2$ are referred to as input leaf nodes. A set of output nodes $O_1$–$O_3$ provide output functions for the materials handling system 200 and are referred to as output leaf nodes.

The materials handling system 200 may represent, for example, a baggage handling system in which bags are introduced at a set of ticket counters $I_1$–$I_2$, possibly pass through an X-ray machine X associated with the component 230 and arrive at a set of designated destinations $O_1$–$O_3$.

The materials handling system 200 may represent a manufacturing system where items from earlier assembly operations arrive at the input nodes $I_1$–$I_2$ and, depending of some measured or otherwise determined property of an item, are delivered to an operation X, and then transferred to a particular output $O_1$–$O_3$. While not an exhaustive list of examples, these do serve to show the kinds of topological and selection options useful for materials handling.

During a self-organization process in the materials handling system 200, each of the components 210–240 broadcasts an identification message via its nearest neighbor communication paths. Each identification message includes a unique identifier (UID) for the corresponding component and some optional information which may include type indications or other parameters associated with the corresponding component. This enables each component 210–240 to discover and identify its nearest neighbor components.

For example, the straight with process component 230 broadcasts an identification message via the nearest neighbor communication path to the upstream divert component 220 and via the nearest neighbor communication path to the downstream divert component 240. The identification messages inform the diver components 220–240 of the UID of the node in the component 230 associated with the process X. The identification messages contain information regarding the process X and possibly other information as hereinafter described. As another example, the divert component 220 transfers identification messages via the nearest neighbor communication paths to the merge component 210, the straight with process component 230 and the output node $O_1$ which informs them of the UID and other information associated with the divert component 220.

In one embodiment, each of the components 210–240 broadcasts the information it obtains regarding its nearest neighbor components on the global communication path. For example, the divert component 220 broadcasts a packet on the global communication path that contains its UID and related information as well as an enumeration of the UID and related information of its nearest neighbor components 210, 230, and the output node $O_1$.

Any one or more of the components 210–240 or any other node that can access the global communication path such as a separate computer system may obtain these broadcasted packets and use the information contained therein to construct a topological map of the materials handling system 200. For example, a monitoring computer system that can access the global communication path may implement specialized software that constructs a topological map the materials handling system 200 in response these packets broadcasted on the global communication path. Periodic broadcasting of this information enables a monitoring computer system to obtain updated system topology and to determine whether any of the components have failed by failing to broadcast the information.

The components 210–240 may render local routing decisions as items are transported through the materials handling system 200. For example, the divert component 220 renders a decision for each item received from the merge component 210 whether to transport the item to the output node $O_1$ or the component 230. The items may be undifferentiated and the components 210–240 may render item routing decisions based on a locally measured property such as whether an item is full or empty, or a global recipe currently in force, or the time of day, or the number of items processed to date to name a few examples.

The components 210–240 render routing decisions for an item by first determining a property or an attribute associated with the item. In one embodiment, the components 210 perform a measurement of the item to determine its property or attribute for routing purposes. A component that measures the property or attribute for an item may use the measured property or attribute to render a local routing decision or may pass the measured property or attribute in a message to downstream components to enable downstream components to render routing decisions for the item based upon the property or attribute. For example, the component 220 may include a bar code reader that reads a bar code attribute of items received from the merge component 210. Alternatively, a property or an attribute of an item may be determined by its position in the materials handling system 200.

As another alternative, the input nodes $I_1$–$I_2$ may generate an item token message for each item fed into the materials handling system 200. As the items are passed down-stream among the components 210–240 via the item paths of the materials handling system 200 the item token messages are passed down-stream among the components 210–240 via the corresponding nearest neighbor communication paths. The sequence of arrival of the items at a particular component matches the sequence of arrival of the corresponding item token messages. Each item token message may contain a property or an attribute for the corresponding item which enables the components that receive the item token messages to render routing decisions for the corresponding item.

In yet another alternative, any one or more of the components 210–240 may render routing decisions based upon a formula. For example, the formula may be based upon time of day. At some specified time of day one particular output path may be selected by the formula. The formula may route items evenly among the item output paths or may route items based upon the capacity of downstream components of each item output path. The formula may be based upon a count associated with each item. The count is compared against a recipe or formula in order to make the local decisions. A variation of this is to substitute time for counting in systems where transport rate is known.

Any one or more of the components 210–240 or the output nodes $O_1$–$O_3$ may posses a uniqueness which may need to be taken into account by upstream components as they render routing decisions on items flowing through the materials handling system 200. For example, if the materials handling system 200 is a baggage handling system and the output nodes $O_1$–$O_3$ correspond to different flights then the components 210–240 need the appropriate flight number or other identifiers for the output nodes $O_1$–$O_3$ in order to properly render routing decisions on items of baggage being conveyed. These flight numbers may be measured properties or attributes of the baggage items.

In one embodiment, each component or node in the materials handling system 200 that possesses a uniqueness generates a notification message. The notification messages are transferred upstream through the materials handling system 200 via the nearest neighbor communication paths and each component along the way records the information contained in the notification messages and the nearest neighbor paths by which they were received.

For example, in the example of the baggage handling system 200, the output node $O_2$ generates a notification message that specifies a flight number. The notification message is transferred to the divert component 240 via its nearest neighbor communication path associated with its upper branch output path (output A). The configuration node in the divert component 240 extracts the information from the notification message, records that it was received from the downstream component connected to its upper branch, and relays the notification message to the component 230 via the nearest neighbor input communication path of the divert component 240. In a similar manner, the notification message from the output node $O_2$ is relayed to the divert component 220 and on to the merge component 210 using the nearest neighbor communication paths along the way.

Table 1 shows the information obtained by the components 210–240 after the notification messages from the output nodes $O_1$–$O_3$ have propagated upstream to the input nodes $I_1$–$I_2$. This information enables the components 210–240 to render local routing decisions that will transport items to toward the appropriate destinations in the materials handling system 200.

TABLE 1

| Component | $O_1$ | $O_2$ | $O_3$ | X |
|---|---|---|---|---|
| 210 | downstream | downstream | downstream | downstream |

TABLE 1-continued

| Component | $O_1$ | $O_2$ | $O_3$ | X |
|---|---|---|---|---|
| 220 | upper branch | lower branch | lower branch | lower branch |
| 230 | | downstream | downstream | |
| 240 | | upper branch | lower-branch | |

For example, if the divert component 220 is handling an item that is bound for the output node $O_2$ it uses the information shown in table 1 to determine that the item should be conveyed to its lower branch which moves the item toward the component 230. In the case of the baggage handling example, the divert component 220 identifies the flight number attribute of a bag using a bar code reader. The divert component 220 compares the measured flight number attribute to flight number attributes specified in the notification message from the output nodes $O_1$–$O_3$ and determines that the measured flight number attribute corresponds to the output node $O_2$. The divert component 220 then uses the information in table 1 to transport the bag via its lower branch for item output.

In addition, other nodes in the system 200, such as the leaf nodes associated with the inputs $I_1$–$I_2$ and the node in the component 230 associated with the process X may generate notification messages containing similar information. In addition, similar notification messages may be generated by the nodes associated with the inputs $I_1$–$I_3$ and the process X and transferred downstream to the nodes associated with the outputs $O_1$–$O_3$ for forward notification.

Figure 8:
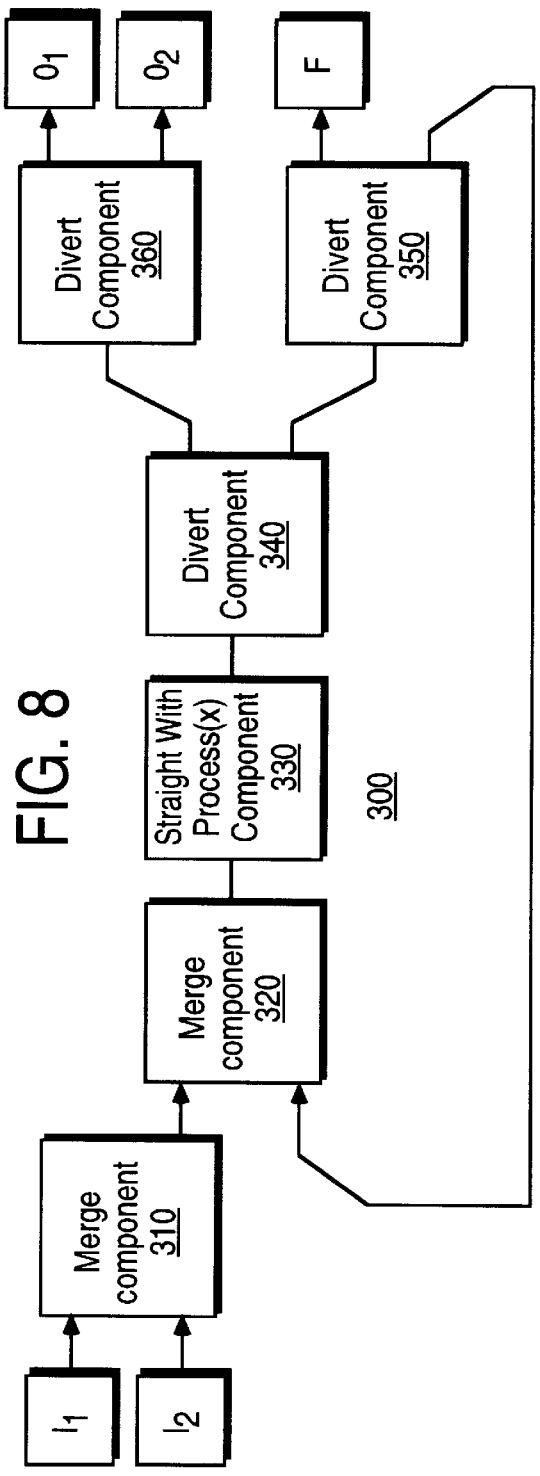
FIG. 8 shows a materials handling system which includes a cyclic path.

FIG. 8 shows a materials handling system 300 which includes a set of components 310–360, $I_1$–$I_2$, $O_1$–$O_2$, and F and which includes a cyclic path between a lower branch output of a divert component 350 and a lower input of a merge component 320. For example, the materials handling system 300 may represent a baggage handling system with an X-ray machine represented as the process X in the component 330. If a bag fails the X-ray it is recycled once and if it fails again it is delivered to an output node F. Bags which pass are delivered to one of the output nodes $O_1$–$O_2$.

The following is a method for discovering the topology of a cyclic system such as the materials handling system 300. All of the unique nodes such as the leaf output nodes $O_1$–$O_3$ and the node in the component 330 associated with the process X generate a corresponding notification message which includes a UID or other standardized information for the corresponding node. The notification messages are transferred upstream via the nearest neighbor communication paths and each component 310–360 records the information contained in the notification messages and the nearest neighbor path through which the messages are received.

If any one of the components 310–360 receives a second copy of a given notification message then it is discarded. For example, a notification message associated with the process X of the component 330 moves upstream to the merge component 320 then to the divert component 350 via the nearest neighbor communication path associated with the lower input of the merge component 320 and back through the components 340, 330, and 320, and 350 in a cycle unless second copies of it are discarded.

Table 2 shows the information recorded by the components 310–360 after notification messages are propagated through the materials handling system 300.

TABLE 2

| Component | O₁ | O₂ | F | X |
|---|---|---|---|---|
| 310 | downstream | downstream | downstream | downstream |
| 320 | downstream | downstream | downstream | downstream |
| 340 | upper branch | upper branch | lower branch | lower branch |
| 350 | lower branch | lower branch | upper branch | lower branch |
| 360 | upper branch | lower branch | | |

In one embodiment, the components 310–360 add an annotation to notification messages before relaying the routing messages upstream. The annotation indicates the identity of the component which enables the routing messages to convey transversed path information. In another embodiment, the notification messages are only discarded by a component when it observes an annotation pattern with a path pattern it has seen before and it is the last annotator in the path before the pattern repeats.

In one embodiment, the uniqueness of a component or node that generates a notification message is represented in three parts. The first part is the UID for addressing to the component. The second part includes application specific information. For example, the application specific information could identify an attached process with an application specific name such as 'X-ray'. Likewise an output component may provide an application specific name such as 'flight 204'. The third part provides parametric information for a component such as information for an X process. The parametric information enables upstream components to determine that a downstream component needs or can use some attribute of an item that is only available from the upstream component. This information can be propagated downstream either via the global communication path of a system or embedded in messages that travel via the nearest neighbor communication paths.

The process for determining system topology described above may be repeated periodically. These periodic updates enables the components of a system, and any external monitors or interfaces to the system, to obtain a current state of the system. This enables components to locally detect errors or to institute changes in local behavior resulting from the disappearance or appearance of paths in the system. It also allows the semantics of paths to be changed dynamically. For example, the application specific information in the notification message from an output component informs the entire system of changes in the delivery patterns for bags in a baggage handling system. The periodic rate should be set appropriate to the time specifications of the application.

Congestion control in a system made up from the basic component 22–30 may be based on downstream conditions. In one embodiment, the notification messages which are propagated upstream include an indication of the capacity and the utilization of the originating component. This information repeated periodically provides the basis for establishing flow congestion control. For example, notification messages may be used to notify upstream components that a particular downstream component which had a capacity of x1 items per hour now has a capacity of x2 items per hour. The capacity and utilization information may be transferred via the nearest neighbor communication paths or the global communication path and can be used locally to help balance the congestion downstream.

The individual components may use the capacity and/or utilization information to render local routing decisions. For example, if a divert component has two item output paths that lead to equivalent destinations then the divert component may route the item to the item output path that has less congestion as indicated by the notification messages which are propagated upstream.

The individual components in a system may transfer notification messages downstream to provide feed-forward status information that may be useful for downstream processes and for downstream routing decisions. For example, a straight with process component may transfer notification messages downstream to indicate that the item output rate for the process is changing.

The following is an example message structure for the notification messages:

{UID, [token-name], capacity, utilization,[tag,value], [tag,value]. . . } where

UID is a unique identifier for the component generating the message.

token_name is an application meaningful name for the component that generates the message.

capacity is the capacity in items/unit time of the component as seen from an upstream point in the system. An upstream component may reduce the capacity as seen further upstream.

utilization is the decimal fraction of the visible capacity actually being used. An upstream component may increase the utilization as seen further upstream as a result of lowering the capacity value.

tag,value pairs include a tag which is an application meaningful name and the value is the corresponding value.

The tags are preferably derived using installation techniques for the materials handling system. For example, in a packing operation the token_name may indicate the kind of product packed in a container while a tag may be a lot/serial number on the particular container. All containers with a certain product are routed along a prescribed set of paths and at some point a process performs an inspection and records the result with a serial number applied earlier.

At any point in the system the undifferentiated handling of items by components can be replaced. For example, if a component has the capability of reading a bar code on an item, and one of the downstream components has conveyed an interest in the bar code via the tag in an upstream notification message during the establishment of topology, then the component reading the bar code is responsible for transforming the flow from undifferentiated to unique and passing the bar code with a message associated with the item. Alternatively, the bar code may be posted on the global network.

At any point in the system a unique model may be replaced with the undifferentiated model provided that the component making this change understands that none of its output paths has indicated a downstream component interested in the uniqueness.

The communication paths of the basic components 22–30, 90 and 95 and the self-organizing methods described above yield a number of advantages. The connections of all components in the system can be determined. Each component is provided with routing information sufficient to make local decisions based on a unique component destinations. Each component is provided with a description of its nearest neighbors. Logical communication paths between nearest neighbor components are established. An information base is provided which indicates the complete topology of a system including periodic updates. A mechanism is provided for downstream components to indicate that they require certain information about items being handled from upstream components.

These advantages are realized through the selection of the components and the assembly into the desired mechanical topology. After the system is assembled, the default periodic update rate may be modified and the application specific names for the unique components set.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A materials handling system, comprising a set of components which are arranged so that each of a set of item input paths of each particular component connects to an item output path of a nearest neighbor one of the components which is located upstream in the materials handling system and each of a set of item output paths of each particular component connects to an item input path of a nearest neighbor one of the components which is located downstream in the materials handling system, each component having means for establishing a nearest neighbor communication oath to each corresponding nearest neighbor component and means for determining the corresponding item output path to be used to route an item toward a unique one of the components in response to a notification message received from the unique one of the components via the nearest neighbor communication paths.

2. The materials handling system of claim 1, wherein each component further comprises means for obtaining a unique identifier for each corresponding nearest neighbor component via the nearest neighbor communication paths.

3. The materials handling system of claim 2, wherein each component further comprises means for transferring a message via a global communication path to the components in the materials handling system wherein the message includes a unique identifier for the component that transfers the message and the unique identifiers of the corresponding nearest neighbor components.

4. The materials handling system of claim 3, wherein the messages from the components enables construction of a topological map of the materials handling system.

5. The materials handling system of claim 4, wherein information contained in the messages from the components enables a determination of whether a failure has occurred in any of the components.

6. The materials handling system of claim 1 wherein the notification message includes a set of congestion information pertaining to the unique one of the component.

7. The materials handling system of claim 1, wherein one or more of the components further comprises means for receiving the notification message from one or more of the components which are located upstream in the materials handling system such that the notification message includes information that enables the component to render a routing decision for an item being transported through the materials handling system.

8. The materials handling system of claim 1, wherein one or more of the components further comprises means for determining an appropriate one of the corresponding nearest neighbor components which are located downstream in the materials handling system to move an item received from one of the corresponding nearest neighbor components which is located upstream in the materials handling system.

9. A materials handling system, comprising a set of components which are arranged so that each of a set of item input paths of each particular component connects to an item output path of a nearest neighbor one of the components which is located upstream in the materials handling system and each of a set of item output paths of each particular component connects to an item input path of a nearest neighbor one of the components which is located downstream in the materials handling system, each component having a configuration node and means for establishing a set of nearest neighbor communication paths to the corresponding nearest neighbor components wherein the configuration node determines the corresponding item output path to be used to route an item toward a unique one of the components in response to a notification message received from the unique one of the components via the nearest neighbor communication paths.

10. The materials handling system of claim 9, wherein the nearest neighbor communication paths for one of the components comprise a physical communication link to each corresponding nearest neighbor component.

11. The materials handling system of claim 9, further comprising a global communication path that enables communication among all the components such that each configuration node transfers a message via the global communication path that includes a unique identifier for the component that corresponds to the configuration node that transfers the message and a set of unique identifiers of the corresponding nearest neighbor components.

12. The materials handling system of claim 11 wherein for one or more of the components the nearest neighbor communication paths and the global communication path are separate physical communication links.

13. The materials handling system of claim 12, wherein one or more of the components further comprise a set of gateways that transfer communication packets among the nearest neighbor communication paths and the global communication path and a local communication path which is used for communication within the component.

14. The materials handling system of claim 11, further comprising a computer system coupled to the global communication path such that the computer system obtains the messages from the components via the global communication path and constructs a topological map of the materials handling system.

15. The materials handling system of claim 9, wherein the notification message includes a set of congestion information pertaining to the unique one of the components.

16. The materials handling system of claim 9, wherein the configuration node in one or more of the components receives a notification message from one or more of the components which are located upstream in the materials handling system such that the notification message includes information that enables the configuration node to render a routing decision for an item being transported through the materials handling system.

17. The materials handling system of claim 9, wherein the configuration node in one or more of the components determines an appropriate one of the nearest neighbor components which are located downstream to move an item received from one of the neighbor components which is located upstream in the materials handling system.

* * * * *